(12) United States Patent
Drevon et al.

(10) Patent No.: US 10,779,361 B2
(45) Date of Patent: *Sep. 15, 2020

(54) METHOD FOR REGISTERING A RADIO ACCESS NETWORK ENTITY WITH A CORE NETWORK FOR A TRACKING AREA, A RADIO ACCESS NETWORK ENTITY THEREOF, AND A CORE NETWORK ENTITY THEREOF

(71) Applicant: Alcatel Lucent, Nozay (FR)

(72) Inventors: Nicolas Drevon, Nozay (FR); Alain Bultinck, Longpont sur Orge (FR); Laurent Thiebaut, Antony (FR)

(73) Assignee: Nokia Technologies OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/375,188

(22) Filed: Apr. 4, 2019

(65) Prior Publication Data

US 2019/0297672 A1 Sep. 26, 2019

Related U.S. Application Data

(62) Division of application No. 11/556,730, filed on Nov. 6, 2006, now Pat. No. 10,257,883.

(30) Foreign Application Priority Data

Nov. 7, 2005 (EP) .................................... 05292352

(51) Int. Cl.
*H04W 88/08* (2009.01)
*H04L 12/18* (2006.01)
(Continued)

(52) U.S. Cl.
CPC .......... *H04W 88/08* (2013.01); *H04L 12/189* (2013.01); *H04W 60/00* (2013.01); *H04W 64/00* (2013.01); *H04W 80/04* (2013.01)

(58) Field of Classification Search
CPC ..... H04W 88/08; H04W 60/00; H04W 80/04; H04W 64/00; H04L 12/189
See application file for complete search history.

(56) References Cited

U.S. PATENT DOCUMENTS 5,960,356 A 9/1999 Alperovich et al.
6,018,573 A 1/2000 Tanaka
(Continued)

FOREIGN PATENT DOCUMENTS

CN 1411646 A1 4/2003
EP 1318688 A2 6/2003
(Continued)

OTHER PUBLICATIONS

Office Action dated Oct. 14, 2014 in corresponding Japanese Patent Application No. 2012-286703.
(Continued)

*Primary Examiner* — Nizar N Sivji
(74) *Attorney, Agent, or Firm* — Harness, Dickey & Pierce, P.L.C.

(57) ABSTRACT

The method includes sending a request to a core network entity to register the radio access network entity with the core network entity for at least one tracking area, the core network entity being in charge of mobility management and/or paging coordination in a cellular mobile communication network. The method further includes receiving a notification of an acceptation or a rejection of said request that indicates if the core network entity has accepted the registration. The radio access network entity is configured to perform the method. The core network entity is configured to interface with the radio access network entity to perform the method.

16 Claims, 3 Drawing Sheets

(51) Int. Cl.
*H04W 60/00* (2009.01)
*H04W 64/00* (2009.01)
*H04W 80/04* (2009.01)

(56) References Cited

U.S. PATENT DOCUMENTS

| | | | |
|---|---|---|---|
| 6,041,228 A | 3/2000 | Niska et al. | |
| 6,088,343 A | 7/2000 | King | |
| 6,292,891 B1 | 9/2001 | Bergenwall et al. | |
| 6,546,247 B1 | 4/2003 | Foti et al. | |
| 6,738,639 B1* | 5/2004 | Gosselin | H04L 12/185 455/518 |
| 6,810,269 B1 | 10/2004 | Aramaki | |
| 6,920,116 B1* | 7/2005 | Hossain | H04L 29/06 370/254 |
| 7,035,637 B2 | 4/2006 | Motegi et al. | |
| 8,504,049 B2* | 8/2013 | Iwamura | H04W 24/08 455/446 |
| 2002/0022453 A1 | 2/2002 | Balog et al. | |
| 2002/0197991 A1 | 12/2002 | Anvekar et al. | |
| 2003/0109254 A1* | 6/2003 | Motegi | H04W 24/02 455/435.1 |
| 2004/0048609 A1 | 3/2004 | Kosaka | |
| 2004/0082313 A1 | 4/2004 | Broyles et al. | |
| 2004/0153455 A1 | 8/2004 | Bhogal et al. | |
| 2004/0162077 A1 | 8/2004 | Kauranen et al. | |
| 2005/0036510 A1* | 2/2005 | Sarikaya | H04W 68/08 370/469 |
| 2007/0047493 A1 | 3/2007 | Park et al. | |
| 2007/0104173 A1 | 5/2007 | Drevon et al. | |
| 2007/0173259 A1 | 7/2007 | Akihara | |
| 2007/0234892 A1 | 10/2007 | Goldman et al. | |
| 2007/0270127 A1 | 11/2007 | Santoro et al. | |
| 2008/0298275 A1 | 12/2008 | De Sousa | |

FOREIGN PATENT DOCUMENTS

| | | |
|---|---|---|
| JP | 2003174665 A | 6/2003 |
| JP | 2004260445 A | 9/2004 |
| JP | 2005531174 A | 10/2005 |
| JP | 2004274174 A | 1/2010 |
| JP | 5607305 B2 | 9/2014 |
| WO | WO-01/45333 A1 | 6/2001 |

OTHER PUBLICATIONS

Office Action dated Feb. 24, 2011, from corresponding Chinese Patent Application No. 2006101437961.
Office Action dated Jan. 29, 2013 from corresponding Japanese Patent Application No. 2008-539404.
Office Action dated Jul. 2, 2012 from corresponding Japanese Patent Application No. 2008-539404.
Office Action dated May 19, 2006 from corresponding European Patent Application No. 05292352.1.
Office Action dated Nov. 19, 2013 in corresponding Japanese Patent Application No. 2012-286703.
Office Action dated Apr. 14, 2014, from corresponding European Patent Application No. 05292352.1.
Office Action dated Nov. 11, 2012 from corresponding Korean Patent Application No. 2008-7013647.
Office Action dated Dec. 7, 2011 in corresponding Japanese Patent Application No. 2008-539404.

* cited by examiner

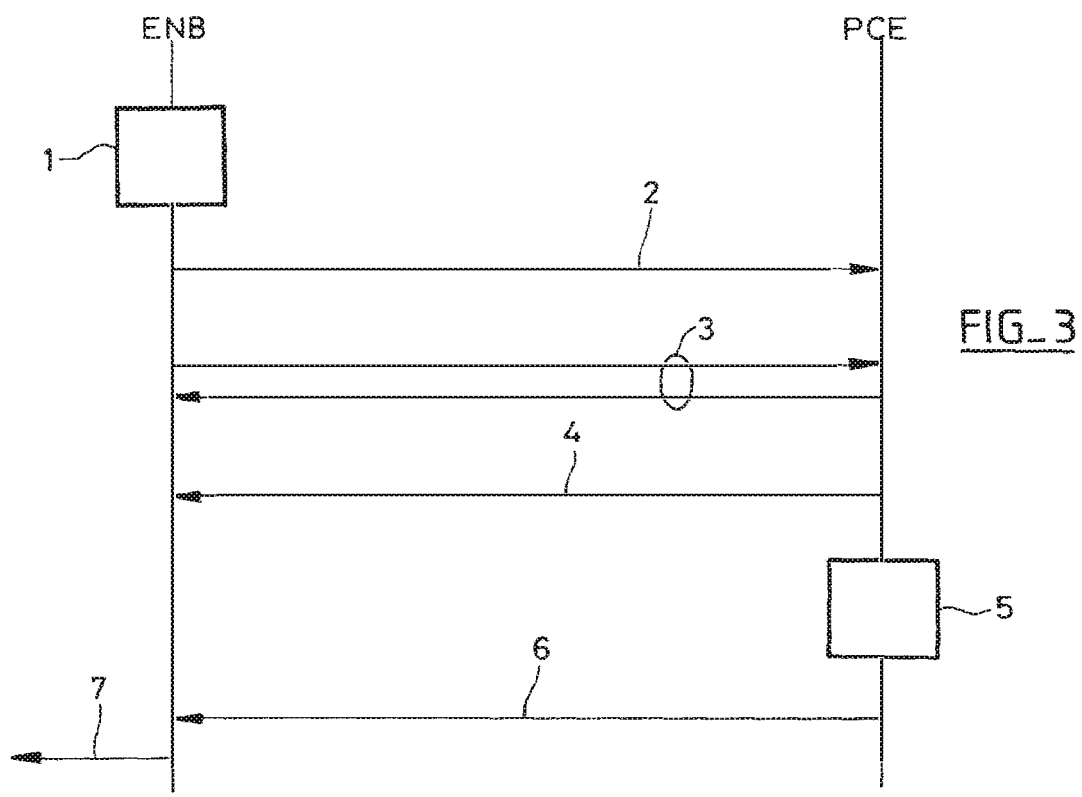
FIG_3
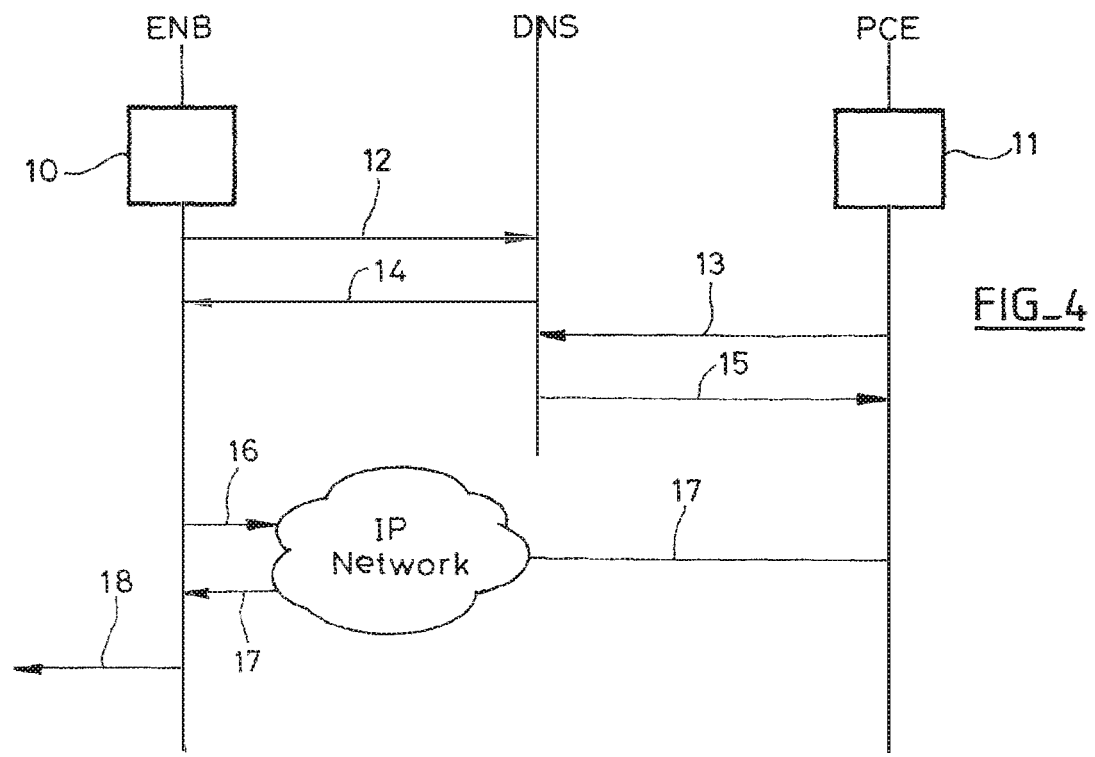
FIG_4

METHOD FOR REGISTERING A RADIO ACCESS NETWORK ENTITY WITH A CORE NETWORK FOR A TRACKING AREA, A RADIO ACCESS NETWORK ENTITY THEREOF, AND A CORE NETWORK ENTITY THEREOF

CROSS-REFERENCE TO RELATED APPLICATIONS

This application is a divisional of U.S. application Ser. No. 11/556,730, filed Nov. 6 2006, which claims priority under 35 U.S.C. § 119 to European Patent Application No. 05292352.1 filed Nov. 7, 2005, the contents of each of which are hereby incorporated by reference in their entirety.

BACKGROUND OF THE INVENTION

Field of the Invention

The present invention generally relates to mobile communication networks.

In a general way, mobile communication networks are subject to standardisation; therefore details on such networks can be found in the corresponding standards, published by the corresponding standardisation bodies.

Description of the Prior Art

Such networks usually comprise a Radio Access Network (RAN) and a Core Network (CN), and usually have a hierarchical architecture.

For example, as recalled in FIG. 1, in GSM (respectively UMTS), RAN nodes such as Base Station (BS) (respectively NodeB) are connected to RAN nodes such as Base Station Controller (BSC) (respectively Radio Network Controller (RNC)) in a hierarchical way. In the same way, RAN nodes such as BSC (respectively RNC) are connected in a hierarchical way to CN nodes such as Mobile Switching Center/Visitor Location Register (MSC/VLR) (for a Circuit-Switched (CS) domain) or Serving GPRS Support Nodes (SGSN) (for a Packet-Switched (PS) domain), in turn connected in a hierachical way to other CN nodes such as Gateway Mobile Switching Center (GMSC) for CS domain, or Gateway GPRS Support Node (GGSN) for PS domain. RAN nodes such as BS/NodeB communicate with Mobile Stations (MS) (respectively User Equipment (UE)), not specifically illustrated, over a radio interface. CN nodes such as GMSC/GGSN communicate with other networks, not specifically illustrated.

Usually, CN nodes such as MSC/VLR and/or SGSN are in charge of a number of functions, including in particular a Mobility Management (MM) function and a Paging Coordination (PC) function.

The Mobility Management (MM) function includes, for MS/UE which are not actively engaged in a connection (in particular MS/UE in idle mode) keeping track of MS/UE location with the accuracy of an area (usually called Location Area (LA) or Routing Area (RA)) made of a set of cells, and checking user access rights on said LA/RA basis, using subscription data held in a subscriber database such as Home Location Register (HLR) or Home Subscriber Server (HSS).

The Paging Coordination (PC) function includes contacting the appropriate RAN nodes for the sending of paging messages over the last LA/RA where a MS/UE has been registered, when there is a need to reach the MS/UE, such as for example for an incoming call or session.

In each cell, the corresponding LA/RA is broadcast on the radio interface so that a MS/UE moving from one cell to another cell can know whether the LA/RA has changed or not. When the LA/RA has changed, MM procedures (such as Location Update procedures) are carried out for registering the MS/UE in the new LA/RA.

LA/RA configuration is important for network optimisation, in particular for optimising the amount of signalling traffic in the network, in particular for Mobility Management and Paging Coordination functions. LA/RA configuration is generally performed via Operation & Maintenance (O&M) operations.

In a hierarchical architecture as recalled for example in FIG. 1, such LA/RA configuration usually comprises two operations: the mapping between LA/RA and BSC/RNC nodes is configured by O&M in the CN, and the set of cells belonging to a given LA/RA is configured by O&M in the BSC/RNC.

Each time there is a change in the RAN configuration, such as for example when a new BS/NodeB is added or removed, the RAN operator has to configure the RAN nodes (BSC/RNC) accordingly. This has no impact on the CN configuration, i.e. the CN operator does not have to configure the CN nodes (MSC/SGSN) accordingly, if at least one cell controlled by the BSC/RNC is in an existing LA/RA. In other words, while the configuration of RAN nodes may change relatively frequently, in the above-recalled hierarchical architecture CN nodes can be configured on a permanent or semi-permanent basis.

Now, there is an evolution of the architecture of such networks towards future generation networks. An example of an architecture of such future generation networks is illustrated in FIG. 2. The trend is to go from the above-recalled hierarchical architecture to a "flat" architecture, or in other words to reduce the number of "intermediate" nodes (such as BSC/RNC in the above-recalled hierarchical architecture), in order to reduce setup delays and user plane latency. In particular, the trend is to go from four nodes such as GGSN—SGSN—BSC/RNC—BS/NodeB, to two nodes such as ASGW (Access System GateWay)—ENB (Enhanced NodeB), in the user plane and possibly in the control plane as well. The MM function and the PC function (in the control plane) can be hosted in the ASGW or in a separate node (such as the node noted MM/PC in FIG. 2). The PC function can be located in the CN or in the RAN. Generally, the network entity in charge of MM function is called Mobility Management Entity (MME), and the network entity in charge of PC function is called Paging Coordination Entity (PCE), regardless of the physical network node(s) where these functions can be located. Nodes such as ENB, ASGW, MME, PCE are interconnected by an IP-based transport network or backbone.

SUMMARY OF THE INVENTION

As recognized by the present invention, in such architectures of future generation mobile networks, there is a need to improve and/or simplify the configuration of the network with Tracking Areas (where TA is a more general term covering in particular the term LA/RA used heretofore).

For example, in an architecture where the PC function is located in the CN, each time a ENB would be added to or removed from a TA, the CN operator would be obliged to change the PCE configuration accordingly. in other words this would result in a high number of ENB addresses to be configured in the CN, a high workload for the CN operator, and a risk of lack of coordination between configuration operations in the CN and in the RAN, in particular when these CN operator and the RAN operators are different (such as for example in the case of shared networks where the RAN network is shared between several different CN operators). Still in other words, CN nodes could no longer be configured on a permanent or semi-permanent basis, contrary to what is the case in the above-recalled hierarchical architecture.

The present invention in particular enables to solve part or all of the above-mentioned problems, or to avoid part or all of the above-mentioned drawbacks. More generally, the present invention enables to improve and/or simplify network configuration operations, in particular in connection with Mobility Management and/or Paging Coordination functions.

These and other objects are achieved, in one aspect of the present invention, by a method for configuring a cellular mobile communication network with Tracking Areas, comprising:

a step of configuring a Radio Access Network entity, with at least one Tracking Area it is to be associated with, a step of registering a thus configured Radio Access Network entity onto a Mobility Management function and/or Paging Coordination function, for said at least one Tracking Area.

In a first embodiment, said step of registering comprises:

a step wherein said Radio Access Network entity registers onto at least one Mobility Management entity and/or Paging Coordination entity in charge of said Mobility Management function and/or Paging Coordination function, for said at least one Tracking Area.

In said first embodiment, said step of registering onto said Mobility Management entity and/or Paging Coordination entity advantageously comprises:

a step of sending a registration request to said Mobility Management entity and/or Paging Coordination entity.

In said first embodiment, said step of configuring advantageously comprises:

a step of configuring said Radio Access Network entity with a destination address for the sending of said registration request.

In said first embodiment, said step of registering advantageously comprises:

a step of performing mutual authentication between said RAN entity and said Mobility Management/Paging Coordination entity, upon reception of a registration request by said Mobility Management entity and/or Paging Coordination entity.

In said first embodiment, said step of registering advantageously comprises:

a step of, upon acceptance of a registration request, configuring said Mobility Management entity and/or Paging Coordination entity with a destination address for the sending of Mobility Management and/or Paging Coordination messages to said Radio Access Network entity.

In a second embodiment, in a transport network having IP multicast capability, said step of registering comprises:

a step wherein a Radio Access Network entity registers onto an IP multicast group, associated with said at least one Tracking Area, for the reception of Mobility Management and/or Paging Coordination messages.

In said second embodiment, said step of registering advantageously comprises:

a step of associating an IP multicast address with said Tracking Area.

In said second embodiment, said step of associating advantageously comprises:

a step of interrogating a Domain Name Server for translation of a Domain Name associated with said Tracking Area into an IP multicast address.

In said second embodiment, said step of associating advantageously comprises:

a step of building automatically a DNS name associated with said Tracking Area based on a pre-defined pattern, configured on all RAN and Mobility Management and/or Paging Coordination entities, and on the identity of the tracking Area.

These and other objects are achieved, in another aspect of the present invention, by a Radio Access Network entity, comprising:

means for, upon configuring said Radio Access Network entity with at least one Tracking Area it is to be associated with, registering said Radio Access Network entity onto a Mobility Management function and/or Paging Coordination function, for said at least one Tracking Area.

In a first embodiment, said means for registering comprise:

means for registering onto at least one Mobility Management entity and/or Paging Coordination entity in charge of said Mobility Management function and/or Paging Coordination function, for said at least one Tracking Area.

In said first embodiment, said means for registering advantageously comprise:

means for sending a registration request to said Mobility Management entity and/or Paging Coordination entity.

In said first embodiment, said means for registering advantageously comprise:

means for performing authentication between said RAN entity and said Mobility Management/Paging Coordination entity, upon reception of a registration request by a Mobility Management entity and/or Paging Coordination entity.

In a second embodiment, in an IP-based transport network having IP multicast capability, said means for registering comprise:

means for registering onto an IP multicast group, associated with said at least one Tracking Area, for the reception of Mobility Management and/or Paging Coordination messages.

In said second embodiment, said means for registering advantageously comprise:

means for associating an IP multicast address to said Tracking Area.

In said second embodiment, said means for associating advantageously comprise:

means for interrogating a Domain Name Server for translation of a Domain Name associated with said Tracking Area into an IP multicast address.

In said second embodiment, said means for registering advantageously comprise:

means for building automatically a DNS name associated with said Tracking Area based on a pre-defined pattern, configured on all RAN and Mobility Management and/or Paging Coordination entities, and on the identity of the tracking Area.

These and other objects are achieved, in another aspect of the present invention, by an entity of a mobile communication network, in charge of Mobility Management function and/or Paging Coordination function, for at least one Tracking Area, comprising, in a first embodiment:

means for registering a Radio Access Network entity onto said entity, for said at least one Tracking Area.

In said first embodiment, said means for registering comprise:
   means for receiving a registration request from said Radio Access Network entity.
In said first embodiment, said means for registering advantageously comprise:
   means for performing authentication between the RAN entity and said Mobility Management/Paging Coordination entity, upon reception of a registration request from said Radio Access Network entity.
In said first embodiment, said means for registering advantageously comprise:
   means for, upon acceptance of a registration request, configuring said entity by adding, or removing, the RAN entity destination address in the RAN entity list associated with the TA for the sending of Mobility Management and/or Paging Coordination messages to said Radio Access Network entity.

These and other objects are achieved, in another aspect of the present invention, by an entity of a mobile communication network, in charge of Mobility Management function and/or Paging Coordination function, for at least one Tracking Area, comprising, in a second embodiment, in an IP-based transport network having IP multicast capability:
   means for associating an IP multicast address with said Tracking Area.
In said second embodiment, said means for associating advantageously comprise:
   means for interrogating a Domain Name Server for translation of a Domain Name associated with said Tracking Area into an IP multicast address.
In said second embodiment, said means for associating advantageously comprise:
   means for building automatically a DNS name associated with said Tracking Area based on a pre-defined pattern, configured on all RAN and Mobility Management and/or Paging Coordination entities, and on the identity of the tracking Area.

BRIEF DESCRIPTION OF THE DRAWINGS

These and other objects of the present invention will become more apparent from the following description taken in conjunction with the accompanying drawings:

FIG. 3 is intended to illustrate an example of a method according to the present invention, according to a first embodiment, FIG. 4 is intended to illustrate an example of a method according to the present invention, according to a second embodiment.

MORE DETAILED DESCRIPTION OF THE INVENTION

Figure 1:
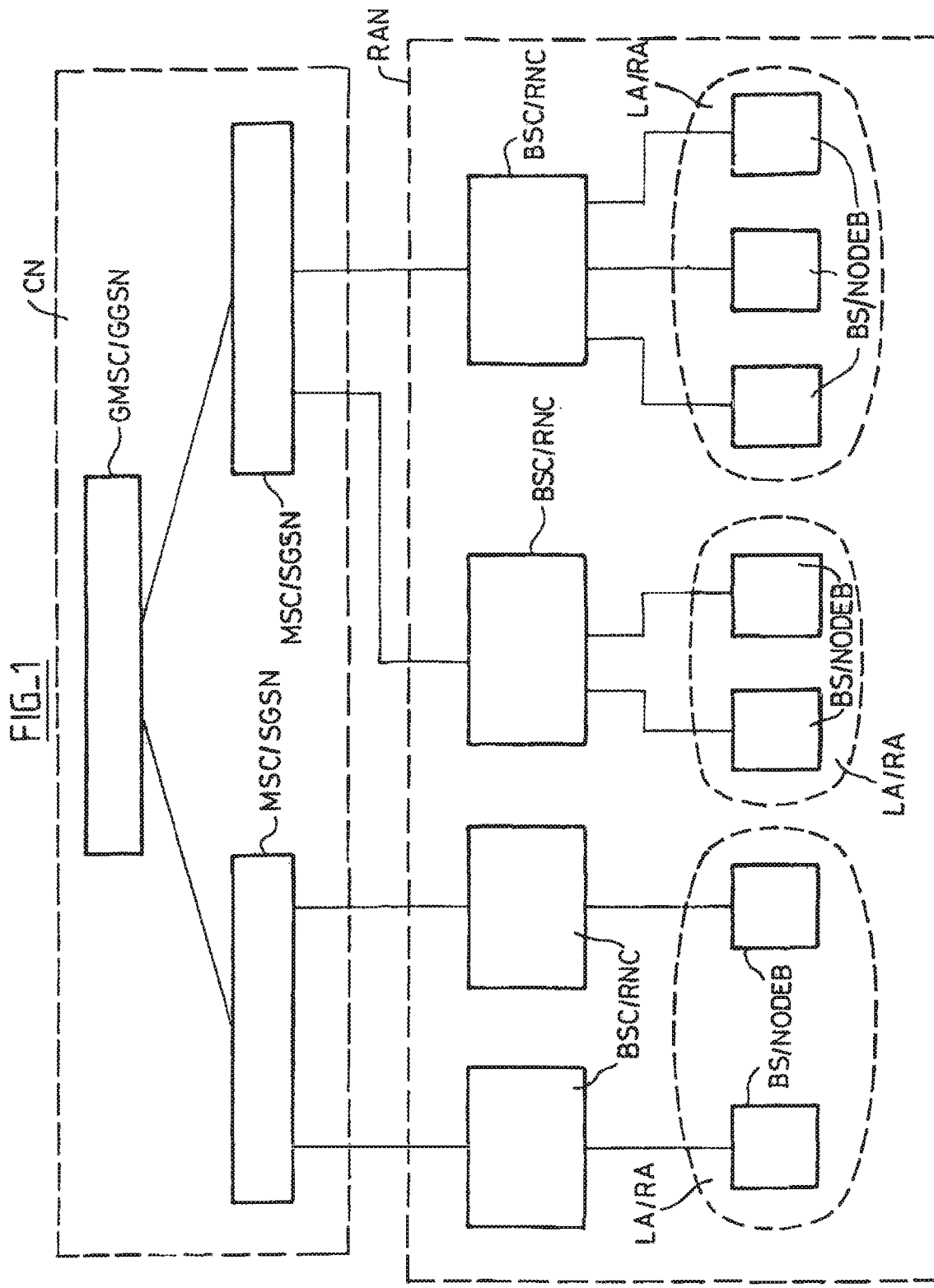
FIG. 1 is intended to recall an example of hierarchical architecture of a mobile communication network.
Figure 2:
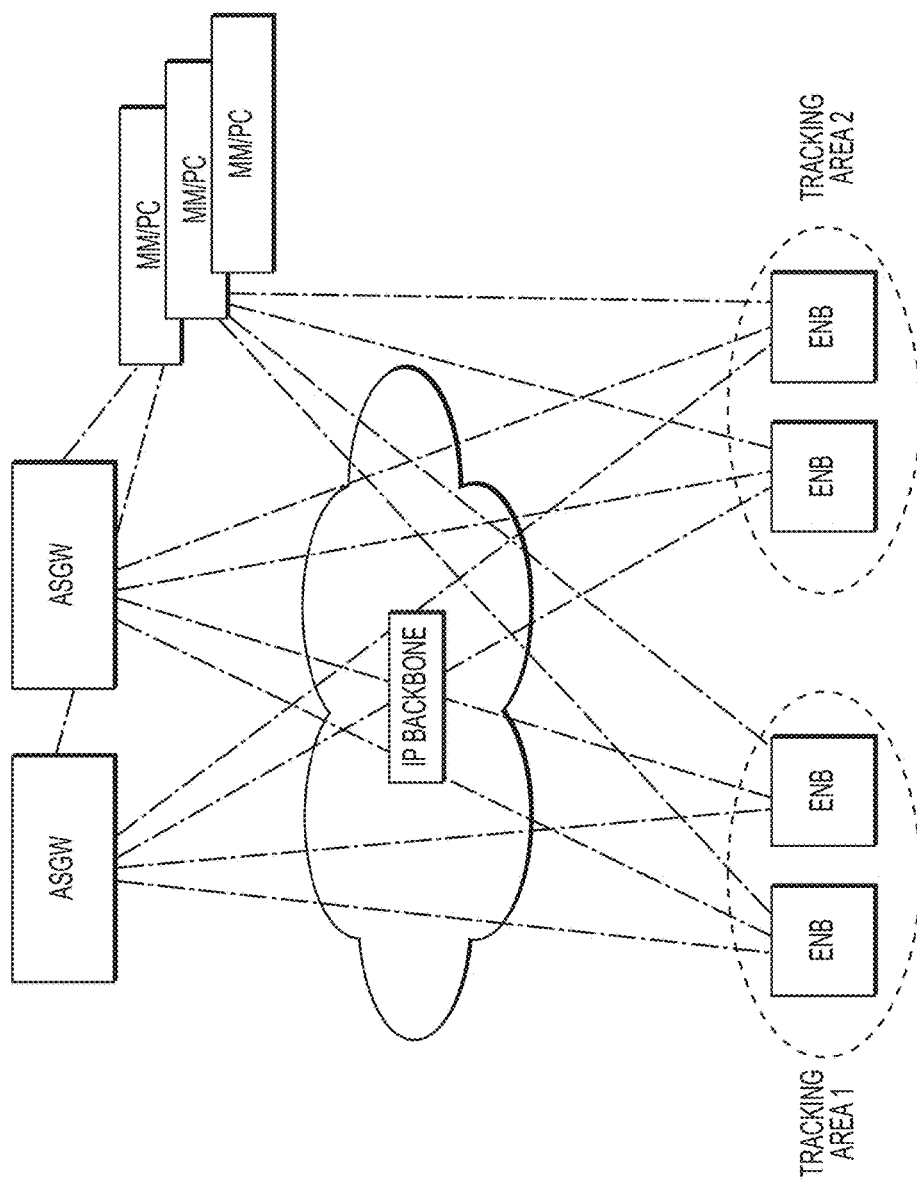
FIG. 2 is intended to illustrate an example of architecture of future generation networks to which the present invention may be applied.

The present invention may also be explained as follows.

The present invention recognizes that, in particular in the context of the evolution towards future generation architectures, there is a need to improve and/or simplify the configuration of mobile communication networks with Tracking Areas.

In particular, the present invention recognizes that there is a need to introduce some automatism in the configuration process.

In particular, the present invention introduces the concept of automatic registration of a RAN entity onto a Mobility Management function and/or a Paging Coordination function.

In the following, the example of a RAN entity corresponding to ENB, and of a PC function, will be considered more particularly; however it should be noted that the present invention is not limited to such example.

In such example, the present invention proposes an automatic registration of an ENB (or Base Station or equivalent node) with its Tracking Area configuration data to the appropriate Paging Coordination Function (PC). This registration could be performed at ENB startup, periodically or at anytime. The ENB is configured by the RAN operator with the Tracking Area(s) corresponding to the cells it supports. Then the ENB registers onto the Paging Coordination Function, thereby indicating that it (the ENB) is to be associated with this/these TA(s) for paging purpose.

The present invention further proposes different embodiments for such an automatic registration of a RAN entity such as for example ENB, onto a function such as PC function for example.

The first embodiment is also referred to as registration at application level. An example of a method according to this first embodiment is illustrated in FIG. 3.

As illustrated in step 1, a ENB (or any RAN node) is configured by the RAN operator with the cells it supports and their associated Tracking Area(s). A Tracking Area may be any mobility area defined for mobile registration—paging purposes such as the Location Area and the Routing Area of a GSM network. For each Tracking Area, the ENB is also configured by the RAN operator with the address of the PCE(s) that manage this Tracking Area. At ENB startup, periodically or at any other time, the ENB sends a Tracking Area(s) registration message, or registration request, to the PCE(s), as illustrated in step 2. Each PCE may perform appropriate authentication in order to prevent a fake ENB to register, as illustrated in step 3. As illustrated in step 4, the PCE accepts or rejects the Tracking Area(s) registration request from the ENB. When the registration request is accepted, the PCE adds (and/or possibly removes, depending on information within the registration message) the ENB address in the Radio Access Network entity list associated with the Tracking Area(s), as illustrated in step 5. When the UE needs to be paged, the PCE is invoked to page the UE on a given TA. The PCE notifies all the ENBs that have registered for the Tracking Area, as illustrated in step 6. The ENB pages the UE on the cells corresponding to the Tracking Area, as illustrated in step 7.

The second embodiment is also referred to as registration at transport level. An example of a method according to this second embodiment is illustrated in FIG. 4.

This second embodiment uses IP multicast capability of the transport network. Details on the IP protocol and its associated IP multicast capability will not be recalled here. Such details can be found in particular in documents published by the IETF (Internet Engineeering Task Force), such as in particular in RFC 2236 for Internet Group Management Protocol (IGMP).

In this second embodiment, the ENB registers onto the IP multicast addresses(s) associated with the TA(s) of the cells it supports. An UE is paged via a paging message sent by the PCE to the IP Multicast address corresponding to the TA where the UE has been registered. In other words, this second embodiment uses IP multicast facility in order to perform this automatic registration.

In other words, in this second embodiment, each Tracking Area is associated with a multicast address. Each ENB subscribes to each multicast address(es) associated with the Tracking Area(s) the ENB is associated with. The PCE wanting to page a UE in a Tracking Area sends a multicast IP message with the multicast destination address corresponding to this Tracking Area.

Advantageously, as illustrated in FIG. 4, the IP multicast address associated with a Location/Tracking Area such as "LAxy" (where xy is the Location/Tracking Area number) is automatically learnt by ENB/PCE from Domain Name Server (DNS). The ENB/PCE build automatically a DNS name associated with the Location/Tracking Area "LAxy" (as illustrated in steps 10, 11), interrogate DNS for translation from this DNS name (as illustrated in steps 12, 13), and get as result (as illustrated in steps 14, 15), the IP multicast address to be associated with the Tracking Area. The ENB registers (as illustrated in steps 16) to this IP multicast address using e.g. IGMP protocol (if IPv4 is used) or e.g. MLD (if IPv6 is used). The IP multicast address to be associated with the Tracking Area is used by PCE to send paging request on this Location/Tracking Area "LAxy" (as illustrated in step 17). The ENB(s) upon reception of the paging request on the IP multicast address associated with the Tracking Area page(s) the UE on the cells corresponding to this Tracking Area, as illustrated in step 18.

Advantageously, the DNS name is made up by using a fixed pattern configured by O&M in all ENB/PCE (simple configuration as valid for all ENB/PCE) with a pattern like "LAxy". A benefit is that there is no need to define a specific IP multicast configuration message from PCE to ENB.

The present invention also has for its object a Radio Access Network entity, and an entity in charge of Mobility Management function and/or Paging Coordination function, comprising means for carrying out a method according to the present invention, for example as disclosed above in connection with FIG. 3 or 4.

The detailed implementation of the above-mentioned means does not raise any special problem for a person skilled in the art, and therefore such means do not need to be more fully disclosed than has been made above, by their function, for a person skilled in the art.

The invention is:

1. A method, comprising:
    sending, by a radio access network entity of a mobile communication network, a request to a core network entity to register the radio access network entity with the core network entity for at least one tracking area, the core network entity being in charge of mobility management and/or paging coordination in a cellular mobile communication network,
    receiving, by the radio access network entity, a notification of an acceptation or a rejection of said request that indicates if the core network entity has accepted the registration,
    wherein said cellular mobile communication network includes a radio access network shared between different core network operators, and said radio access network operated by a radio access network operator is connected to different core networks operated by said different core network operators.

2. A method according to claim 1, comprising:
    performing said sending of a request and said receiving of an acceptation or a rejection of said request, at an application level.

3. A method according to claim 1, comprising:
    performing said sending of a request and said receiving of an acceptation or a rejection of said request, at a startup of said radio access network entity.

4. A method according to claim 1, wherein said radio access network entity includes an enhanced NodeB.

5. A method according to claim 1, wherein said core network entity includes a mobility management entity.

6. The method of claim 1, wherein the radio access network entity has the capability to receive an acceptance of the request and the capability to receive a rejection of the request.

7. A radio access network entity of a mobile communication network, configured to:
    send a request to a core network entity to register the radio access network entity with the core network entity for at least one tracking area, the core network entity being in charge of mobility management and/or paging coordination in a cellular mobile communication network,
    receive a notification of an acceptation or a rejection of said request that indicates if the core network entity has accepted the registration,
    wherein said cellular mobile communication network includes a radio access network shared between different core network operators, and said radio access network operated by a radio access network operator is connected to different core networks operated by said different core network operators.

8. The radio access network entity of claim 7, further configured to:
    perform said sending of a request and said receiving of an acceptation or a rejection of said request, at an application level.

9. The radio access network entity of claim 7, further configured to cause the radio access network entity to:
    perform said sending of a request and said receiving of an acceptation or a rejection of said request, at a startup of said radio access network entity.

10. The radio access network entity of claim 7, wherein said radio access network entity includes an enhanced NodeB.

11. The radio access network entity of claim 7, wherein the radio access network entity has the capability to receive an acceptance of the request and the capability to receive a rejection of the request.

12. A core network entity of a mobile communication network, configured to:
    perform mobility management and/or paging coordination in a cellular mobile communication network,
    receive a request from a radio access network entity, for registering said radio access network entity with said core network entity for at least one tracking area ,
    send to said radio access network entity an acceptation or a rejection of said request,
    wherein said cellular mobile communication network includes a radio access network shared between different core network operators, and said radio access network operated by a radio access network operator is connected to different core networks operated by said different core network operators.

13. The core network entity of claim 12, further configured to:
    perform said receiving of a request and said sending of an acceptation or a rejection of said request, at an application level.

14. The core network entity of claim 12, further configured to:

perform said receiving of a request and said sending of an acceptation or a rejection of said request, at a startup of said radio access network entity.

15. The core network entity of claim 12, wherein said core network entity includes a mobility management entity.

16. The core network entity of claim 12, wherein the core network entity has the capability to accept the request and the capability to reject the request.

* * * * *